Aug. 4, 1942.    T. A. BOWERS    2,292,041
PISTON RING
Filed Aug. 3, 1939
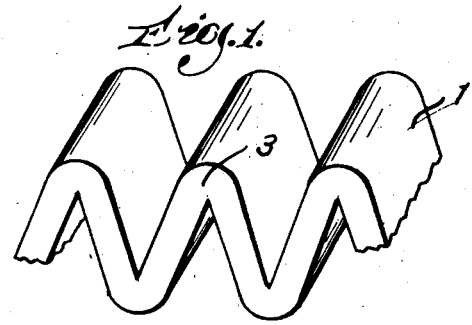
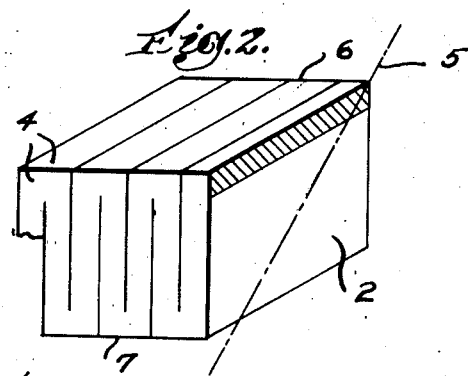
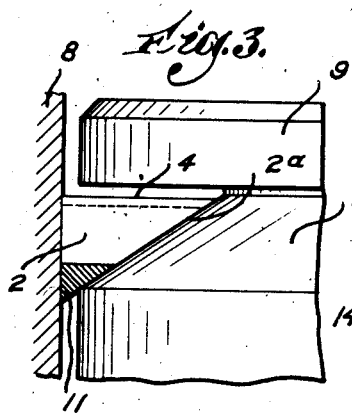
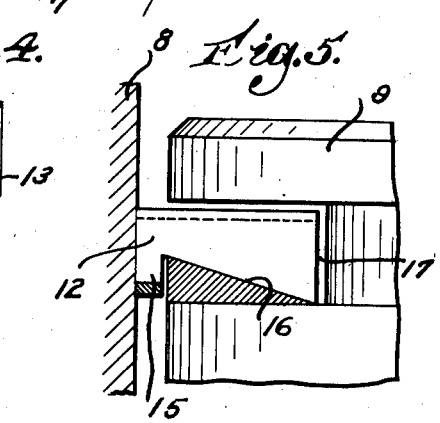
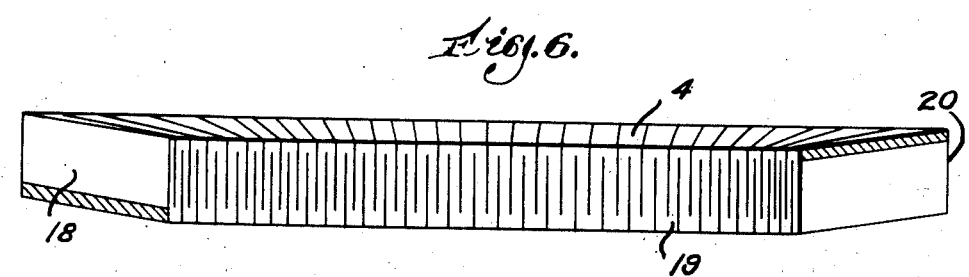
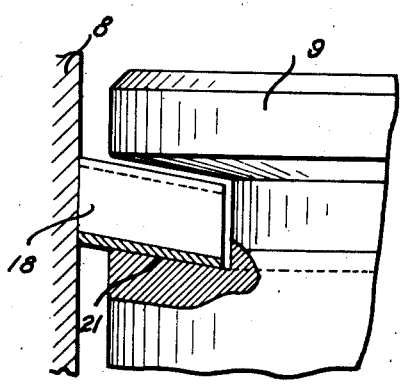
Inventor
Thomas A. Bowers
By
Attorney Patented Aug. 4, 1942

2,292,041

UNITED STATES PATENT OFFICE 2,292,041

PISTON RING

Thomas A. Bowers, Boston, Mass., assignor to Power Research Corporation, Boston, Mass., a corporation of Massachusetts Application August 3, 1939, Serial No. 288,147

6 Claims. (Cl. 309—44)

This invention relates generally to piston rings and especially to piston rings of the compression or sealing type.

It has been found that gas pressure reacting on piston rings is responsible for a major part of all cylinder wear. When piston rings are expanded against a cylinder with a pressure greater than the wall pressure with which they normally engage the cylinder, as for example combustion gas pressure, wear in the cylinder occurs, and in particular "tapered wear", or wear by which the cylinder becomes worn away more at its top than at its bottom.

The present invention has for its chief object the provision of improved piston ring structures which are particularly adapted to overcoming the above cited difficulties and which are so designed and supported in a piston as to overcome or resist fluctuating gas pressures and maintain themselves against a cylinder wall with substantially uniform and optimum wall pressure at all points in the stroke of a piston. It is also an object of the invention to devise a packing which is simple, cheap and durable and to introduce a novel step in a method of fabricating piston rings from metal ribbon.

Attainment of these and other objects of the invention will be readily understood from the following description when read in connection with the accompanying drawing and the novel features will be particularly pointed out in the appended claims.

In the drawing:

Figure 1 is a perspective view illustrating a step in the formation of a piston ring from a strip of metal ribbon.

Fig. 2 is another perspective view fragmentarily illustrating a substantially solid piston ring formed from ribbon material and further indicating a step of forming an angular side in the ring body.

Fig. 3 is an assembly view fragmentarily indicating a cylinder and piston and illustrating a flexible ring which has been cut away, angularly supported in the piston.

Fig. 4 is a perspective view of a modification of a beveled ring construction having an angular side.

Fig. 5 is an assembly view indicating fragmentarily a cylinder and piston and illustrating a ring similar to that shown in Fig. 4 associated therewith.

Fig. 6 is a view in elevation fragmentarily illustrating a further modification of a ring formed with an angular side; and Fig. 7 is an assembly view illustrating association of the ring of Fig. 6 with a piston and cylinder.

In accordance with my invention, I provide a piston ring of substantially flexible character. I form the ring with a beveled under surface and I then support the beveled side of the ring upon a beveled piston groove supporting surface or angular seat. Due to the ring being of flexible character, its angular seating about the piston may be constantly maintained during reciprocation of the piston, and it becomes possible to successfully reduce surface area of the inner ring periphery upon which gas pressure may be effective. I also arrange the slope or angularity of the ring and its piston groove in such a manner that a substantial frictional force between these members is developed which may be utilized to oppose gas pressure tending to excessively expand the ring against its cylinder.

As illustrative of one ring of suitable flexibility, I have shown in Fig. 1 a ring made up of a strip of material 1, which may comprise for example a ribbon of metal such as steel or other compositions. This material is reversely folded upon itself, compacted and bent into a ring body 2 which includes folded portions 3 and intermediate web portions or walls. The folded portions 3 of the ring body 2 are flattened to form crowns 4 making up the top and bottom of the ring, as has been described in detail in my earlier Patent No. 2,076,544.

Portions of the crowns 4 and adjacent web portions or walls are removed throughout a part of the radial width of the ring along one side thereof to provide a beveled under surface 2a.

If desired, the line of cutting may extend from an inner edge 6 to an outer edge 7 of the ring body as illustrated in Fig. 3. The line of cutting may also pass through the ring body at some point inside of the edge 7 as shown in Fig. 2 or at other points. It will be noted that where the crown portions 4 may be partly cut away, the ring will be preserved in a connected state by the remaining crown portions, and those edges of the webs which are exposed by the cutting constitute a seating surface for the ring to seat against the inclined piston groove.

In Fig. 3 I have fragmentarily illustrated a cylinder wall 8 and piston 9, with the piston having an angular ring groove surface 10, upon which has been arranged ring 2. The surface 2a of the ring is beveled to coincide with the piston groove surface 10. By removing the crowns 4 and adjacent web portions along a part of one side of the ring, there are provided crown portions 11 which slightly overhang the piston groove and are in contact with the cylinder 8. It will be observed that as a result of cutting the ring in this way, no inner peripheral surface remains against which pressure may be exerted.

By entirely removing the inner peripheral side of the ring 2, gas pressure can only act vertically against its top. This vertical pressure tends to wedge the ring against the cylinder wall when the ring is in operation and thus increase radial pressure of the ring against the cylinder wall. However, the increase in radial pressure is small in relation to the decrease in radial pressure of the ring against the cylinder resulting from eliminating the inner peripheral surface of the ring against which gas pressure may be exerted. The result of slightly increasing pressure at the top side of the ring and greatly increasing it at the inner peripheral side is to substantially reduce undesirable wear on the cylinder wall.

It may also be readily seen that a much more uniform pressure of the piston ring against the cylinder will be maintained since the counterbalancing of pressures described above is maintained throughout the stroke of the piston. This reduces tapered cylinder wear. It should also be noted that the ring, due to its flexible character, is maintained in substantially sealed relation with respect to a piston groove in all positions of the piston during reciprocation in a cylinder.

In Fig. 4, I have illustrated a modification of beveled flexible ring structure comprising a ring 12 similar to the ring 2 already described, with the difference that the cutting of the under surface of the ring has been oppositely angled. The cutting line occurs in a direction upwardly from the rear edge 13 of the ring 12 and preferably terminates at a point substantially inside of the outer periphery 14 of the ring 12 to provide an overhanging lip 15. Fig. 5 illustrates the ring 12 and a piston 9 formed with an oppositely angled groove surface 16 coinciding with the angular surface resulting from undercutting the ring 12.

In this modification, it will be seen that no attempt has been made to reduce the surface area of the rear face 17 of the ring 12. The slope or angular support of the ring 12 in the piston groove develops a friction force which is resistant to any force tending to urge the ring radially outward. As in the piston ring assembly of Fig. 3, this angular seating of the piston ring about the piston is dependent upon the use of a flexible packing which may be constantly maintained in sealing contact with the angular supporting surface of the piston groove.

In Figs. 6 and 7, I have illustrated a still further modification of a piston ring angularly disposed about a piston. This modification consists essentially in a dished ring 18 an inherent angular formation such that the necessity of cutting portions to effect angularity is eliminated. The ring fragmentarily illustrated in Figs. 6 and 7 is formed in accordance with above noted methods to provide top and bottom crowns 4, inner periphery 19 and outer periphery 20. The crowns 4 extend angularly with respect to the axis of the ring, thereby providing another type of inclined or sloping seating surface in a piston ring. In Fig. 7 I have illustrated assembly of the ring 18 about piston 9 which, is formed with a coincident angular supporting surface 21. The ring 18 functions in a manner similar to that of ring 12 already described.

It is pointed out that by making use of a flexible ring body and by forming a seating side of the ring body angularly, several advantages are obtained. Reduction in undesirable wall pressure is effected from reducing the inner peripheral surface area of the ring upon which gas pressure may be effected and friction forces are utilized also to resist such pressures. By overcoming the difficulties of gas pressure in the manner described, it is possible to maintain a flexible packing on a cylinder wall with a pressure that is uniform all the way around the cylinder and tends to become maintained more nearly uniform at all points in the stroke of the piston, thereby eliminating possible "tapered" wear and substantially all wear resulting from the effect of gas pressure.

The subject matter of the instant invention is broadly claimed in a copending application Ser. No. 397,167, filed June 9, 1941. Specific forms of the invention are claimed in the present application and are not shown in the copending application referred to.

It is intended that various modifications and changes may be resorted to in rings functioning in a similar manner, while continuing to adhere to the spirit of the invention.

I claim:

1. A piston ring comprising a plurality of walls of piston ring material closely compacted one against another, connecting portions for the walls at opposite sides of the ring, connecting portions at one only of the said sides extending throughout a portion of the radial width of the ring to provide a seating surface which extends at an acute angle with respect to the axis of the ring.

2. A piston ring comprising a plurality of closely compacted walls of piston ring material, connecting portions for the walls at opposite sides of the ring, connecting portions at one of the said sides being partially removed to provide a surface which extends angularly with respect to the axis of the ring from the upper inner peripheral edges of the ring throughout a part only of the radial width of the ring.

3. A piston ring comprising a plurality of compacted walls of piston ring material, connecting portions for the walls at opposite sides of the ring, connecting portions occurring at one of the said sides extending from the outer periphery of the ring throughout a portion only of the radial width of the ring, said ring presenting a recessed surface which extends at an acute angle with respect to the axis of the ring from a lower inner peripheral edge radially outward.

4. A piston ring comprising a plurality of closely compacted walls of piston ring material, connecting portions for the walls at opposite sides of the ring, connecting portions occurring at one of the said sides extending throughout a portion only of the radial width of the ring to provide a surface which extends angularly from the edge forming the inner periphery of the ring to the lower outer peripheral edge of the ring.

5. A flexible packing ring for pistons and the like, comprising a multiplicity of compressed corrugations fabricated from a strip of resilient piston ring material to present web portions and connecting crown portions, portions of the crowns and webs along one side only of the ring being removed to provide an angular seating surface, those crown portions occurring adjacent the said angular seating surface being of a radial width less than the radial width of the ring.

6. A piston ring comprising a plurality of layers of resilient sheet metal, said ring having at one side only thereof connecting portions which extend throughout a portion only of the radial width of the ring to provide a conical land surface, said land surface adapted to seal the ring in a piston groove having an inclined side, said layers of sheet metal being yieldable with respect to one another in a direction axially of the ring, thereby to allow the conical land surface to seal with the said inclined piston groove side when the ring is distorted throughout a portion of its circumferential length in a direction axially thereof.

THOMAS A. BOWERS.